(12) United States Patent
Maekawa et al.

(10) Patent No.: US 6,392,236 B1
(45) Date of Patent: May 21, 2002

(54) RADIATION DETECTOR

(75) Inventors: Tatsuyuki Maekawa, Tokyo; Akio Sumita; Toshifumi Sato, both of Kanagawa-ken; Soichiro Morimoto, Tokyo, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 10 days.

(21) Appl. No.: 09/626,165

(22) Filed: Jul. 26, 2000

(30) Foreign Application Priority Data

Jul. 30, 1999 (JP) .......................... 11-217032

(51) Int. Cl.[7] .............................. G01T 1/208
(52) U.S. Cl. .................. 250/369; 250/370.11
(58) Field of Search ............... 250/369, 370.11, 250/390.11, 484.2

(56) References Cited

U.S. PATENT DOCUMENTS 3,891,852 A * 6/1975 Bollen et al. ............... 250/391

FOREIGN PATENT DOCUMENTS

JP 5-341047 12/1993

\* cited by examiner

Primary Examiner—Scott J. Sugarman
Assistant Examiner—Richard Hanig
(74) Attorney, Agent, or Firm—Foley & Lardner

(57) ABSTRACT

There is provided a radiation detector capable of discriminating a kind of rays in radiation. The radiation detector includes a scintillator and a discriminator. The scintillator scintillates depending on the type of radiation and generates a first output signal and second output signals after the first output signal. The second output signals vary the signal pattern thereof with a kind of rays in radiation. The discriminator discriminates a kind of rays in radiation based on the first signal and the second signals. The scintillator has multiple scintillation characteristics, and includes $Gd_2O_2S$ (GOS) or $Y_2O_2S$ (YOS), for example.

17 Claims, 10 Drawing Sheets

FIG.18
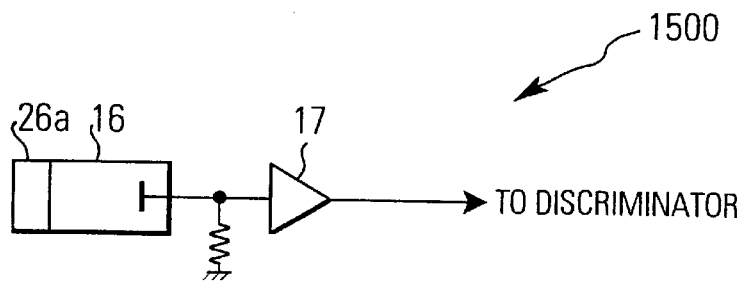
FIG.19A   FIG.19B
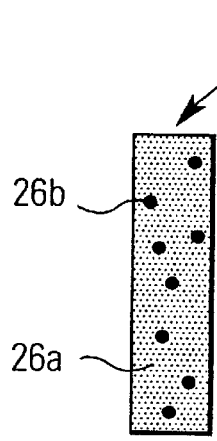 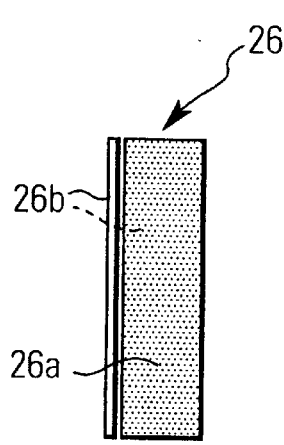
FIG.20
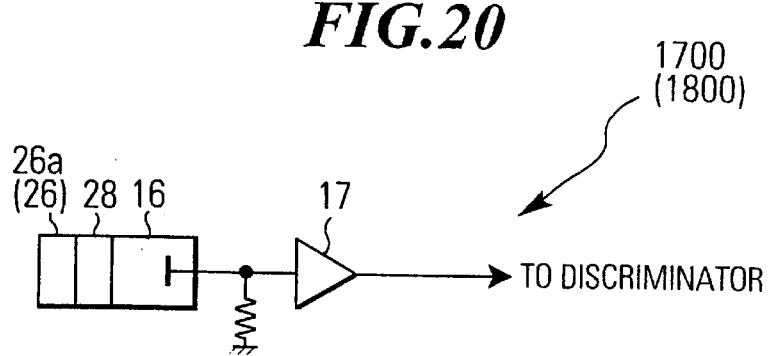

RADIATION DETECTOR

BACKGROUND

1. Field of the Invention

The present invention relates to a radiation detector, and more particularly to a radiation detector capable of discriminating differences in electric charge quantity or mass number between an alpha ray and a beta ray, an alpha ray and a gamma ray, an alpha ray and a proton ray or an ion beam.

2. Description of the Related Art

Discriminating methods for detecting radiation by using a scintillator are well-known. These discriminating methods enable distinguishing a neutron from a gamma ray, an alpha ray from a beta (or the gamma) ray or the like. Here, a method of discriminating between the neutron and the gamma ray is called "zero-crossing method", and this method employs a liquid scintillator in order to discriminate radiation by time. The zero-crossing method applies the fact that there exists a time difference between double-differentiated waveforms thereof on zero axis due to difference of rise times.

As for a method of discriminating the alpha ray from the beta (or the gamma) ray, a so called "rise time discriminating method" is often employed. In this method, a delayed signal and an attenuated amplitude signal are obtained from one signal, and a time difference between these signals is assumed to be in proportion to the rise times thereof, thereby converting to pulse height signals. This method, employing the rise time information for discriminating the alpha ray from the gamma ray, is known as a phoswich detector. Here, the "phoswich detector" is named after a "sandwich type phosphor detector".

FIG. 1 shows a basic structure of the phoswich detector.

In FIG. 1, a photo detector (radiation sensing part) 30 includes a powdery ZnS(Ag) scintillator 30a and a plastic scintillator 30b thinly spread on the ZnS(Ag) scintillator 30a. An alpha ray is mainly detected by the ZnS(Ag) scintillator 30a, and a beta ray is mainly detected by the plastic scintillator 30b. The scintillation decay time of the ZnS(Ag) scintillator 30a is rather long, such as microseconds, while the scintillation decay time of the plastic scintillator 30b is rather short, such as ten nanoseconds. A photomultiplier tube 16 is equipped with a preamplifier having an integrator whose time constant is longer than the scintillation decay time. Therefore, if the output from the photo detector 30 is applied to the photomultiplier tube 16, the rise time of the output from the photomultiplier tube 16 indicates information as to the scintillation decay time of each scintillator.

The output from the photomultiplier tube 16 is amplified by a fast amplifier 32, and is then analyzed by a time analyzer 33. The output from the time analyzer 33 is given by a pulse signal whose pulse height is proportional to the rise time. Therefore, the scintillations of the ZnS(Ag) scintillator 30a and the plastic scintillator 30b can be discriminated by employing a pulse height discriminator and a counter, or a multi-channel pulse height analyzer.

However, conventional methods need supplemental devices other than general detectors of scintillation to discriminate radiation. Therefore, this requires additional cost for the supplemental devices.

Further, these discriminating methods include attenuation of signals caused by differentiation in the zero-crossing method and by intended actions in the rise time discriminating method, and these attenuations are known to affect S/N ratio. Therefore, conventional methods do not have enough performance to detect and discriminate radiation.

SUMMARY OF THE INVENTION

The present invention has been made in view of the above-mentioned circumstances and is intended to solve the above-mentioned problems. In particular, the object of the present invention is to provide a radiation detector having a simple and inexpensive structure, and capable of discriminating radiation with high efficiency.

The present invention provides a radiation -detector, including: a scintillator that scintillates depending on radiation and generates a first output signal and at least one second output signal after the first output signal, wherein said at least on second output signal or signals vary the signal pattern thereof with a kind of rays in radiation; and a discriminator that discriminates a kind of rays in radiation based on the first signal and the second signals.

The scintillator may have a multiple scintillation characteristic. The scintillator may include $Gd_2O_2S$ (GOS) or $Y_2O_2S$ (YOS). The scintillator may be activated by europium (Eu) or terbium (Tb).

The number of the second output signals while a beta ray is detected may be larger than when an alpha ray is detected.

The discriminator may further include: a time gate generator that generates a time gate having a certain time width as an input of the first signal as a starting point; a counter that counts the number of the second signals in the time gate; and a multiple scintillation discriminator that compares a counted number in the time gate with a predetermined value thereby outputs a discriminated result.

The discriminator may further include: a time gate generator that generates a time gate having a certain time width as an input of the first signal as a starting point; a counter that counts the number of the second signals in the time gate and divides the time gate proportionally in order to count the number of signals in each of the divided time gates; and a multiple scintillation discriminator that compares a counted number in the divided time gate with a predetermined value thereby outputs a discriminated result.

The discriminator may further include: a multiple time gate generator that generates time gates having a certain time width as inputs of the first signal and the second signal as starting points; a gate width discriminator that compares width of the time gates with a predetermined value thereby outputs a discriminated result.

The discriminator may further include, an amplifier that includes a resistor and a condenser coupled in parallel to each other, the amplifier charges a current obtained by photoelectric conversion of the first signal and the second signals to the resistor and the condenser, and amplifies charged/discharged voltage generated on terminals as an integrated waveform; and an integrated pulse height value discriminator that compares pulse heights of the waveforms with a predetermined value thereby outputs a discriminated result.

The discriminator may further include: a time gate generator that generates a time gate having a certain time width as an input of the first signal as a starting point; and a time interval discriminator that compares a time interval of the second signals generated in the time gate with a predetermined time interval thereby outputs a discriminated result.

The discriminator may further include: a time gate generator that generates a time gate having a certain time width as an input of the first signal as a starting point; and a pulse height value discriminator that compares a pulse height value of a pulse signal of the first signal with a pulse height value of a pulse signal of the second signal thereby outputs a discriminated result.

The discriminator may further include: a time gate generator that generates a time gate having a certain time width as an input of the first signal as a starting point; a counter that counts the number of the second signals in the time gate; a discriminator that compares a counted number in the time gate with a predetermined value thereby outputs a discriminated result; and a dead time compensator that compensates the discriminated result by considering a dead time of the counter.

The scintillator may include a first material capable of providing a multiple scintillation and a second material capable of radiating a charged particle. The scintillator may include a first material capable of providing a multiple scintillation and a third material capable of providing a non-multiple scintillation.

The scintillator may include a material capable of providing a multiple scintillation and a material capable of providing a non-multiple scintillation, and the multiple scintillation and the non-multiple scintillation may be individually detected so that the first output signal and the second output signal are respectively generated.

The present invention further provides a scintillator including a material having multiple scintillation characteristics and scintillates depending on radiation and generates a first output signal and at least one second output signal after the first output signal, wherein said at least one second signal varies the signal pattern thereof with a kind of rays in radiation.

The present invention further provides a method of discriminating a kind of rays in radiation, including: providing a scintillator that scintillates depending on radiation and generates a first output signal and at least one second output signal after the first output signal, wherein said at least one second output signal varies the signal pattern thereof with a kind of a ray in radiation; and discriminating a kind of rays in radiation based on the first signal and said at least one second signal.

BRIEF DESCRIPTION OF DRAWINGS

The accompanying drawings, which are incorporated in and constitute a part of this specification, illustrate several preferred embodiments of the present invention and, together with the description, serve to explain the principles of the present invention.

FIG. 18 is a diagram showing a radiation detector according to a fifteenth embodiment of the present invention.

FIGS. 19A and 19B are sectional views showing scintillators capable of applying a radiation detector according to a sixteenth embodiment of the present invention.

FIG. 20 is a diagram showing a radiation detector according to a seventeenth embodiment and an eighteenth embodiment of the present invention.

DESCRIPTION OF PREFERRED EMBODIMENTS

Preferred embodiments of a radiation detector of the present invention are now specifically described in more detail with reference to the accompanying drawings. Wherever possible, the same reference numbers are used throughout the drawings to refer to the same or like parts.

(First Embodiment)

Figure 1:
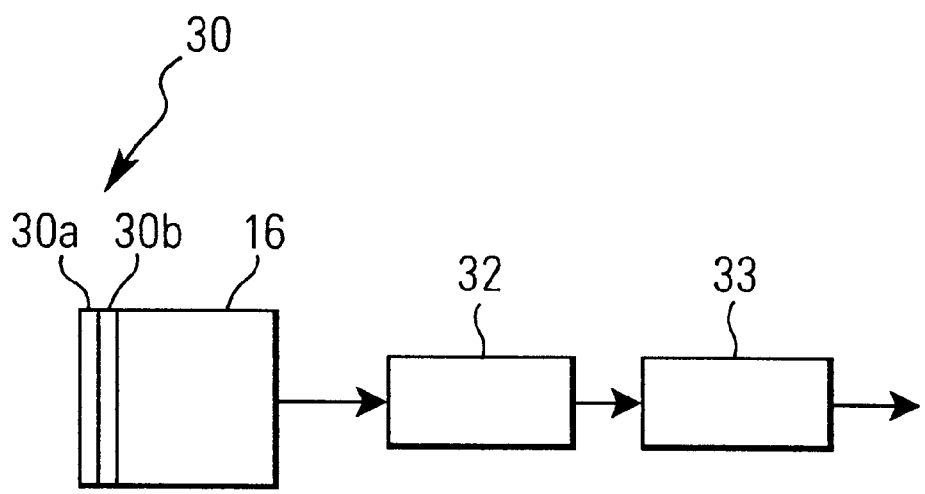
FIG. 1 is a diagram showing a basic structure of a conventional radiation detector.
Figure 2A:
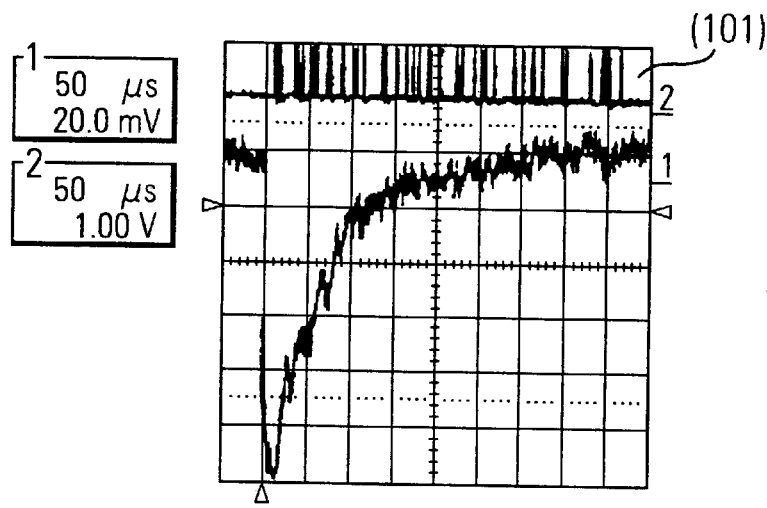
FIGS. 2A, 2B and 2C are graphs showing multiple scintillation characteristics according to a first embodiment of the present invention.
Figure 2B:
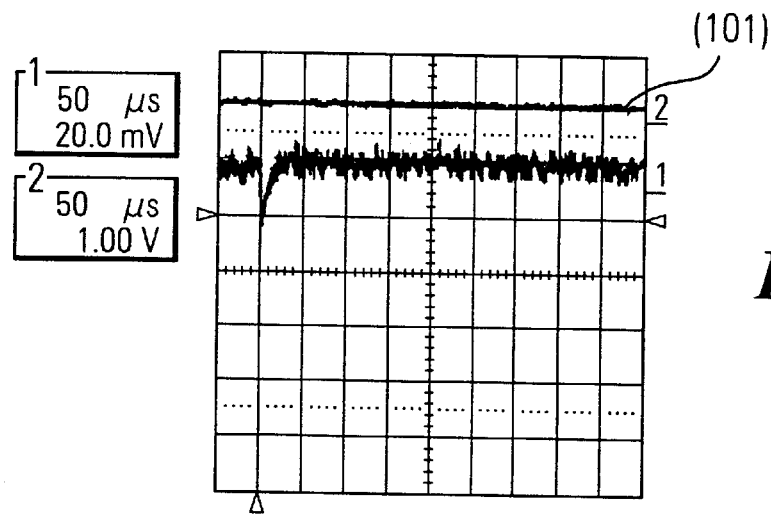
Figure 2C:
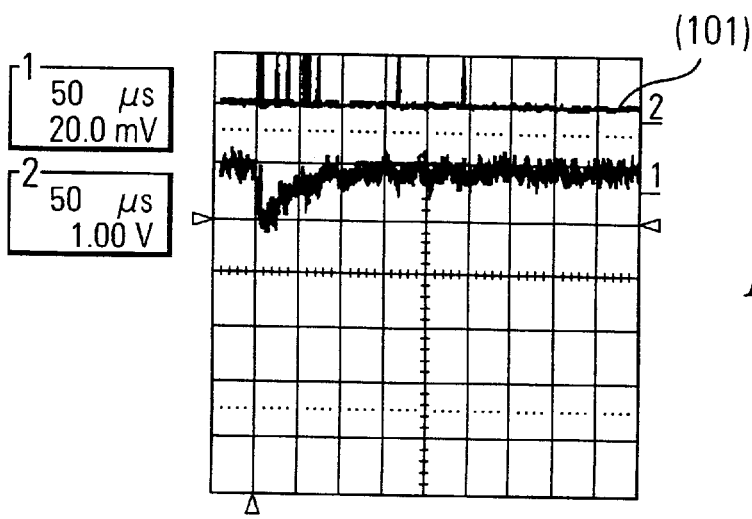
Figure 3:
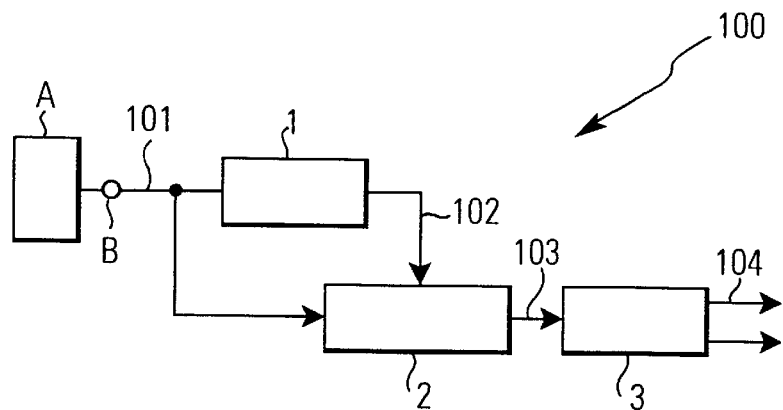
FIG. 3 is a diagram showing a radiation detector according to the first embodiment of the present invention.
Figure 4:
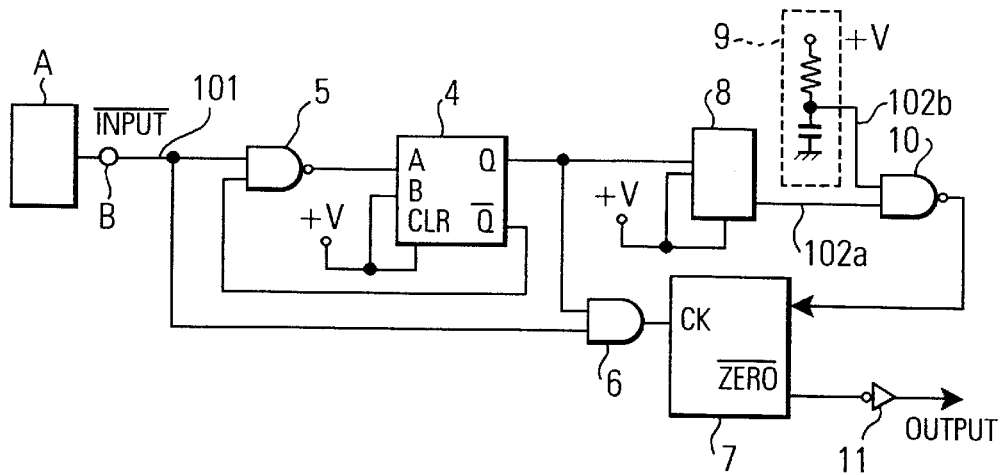
FIG. 4 is a detailed diagram showing a radiation detector according to the first embodiment of the present invention.

FIGS. 2A, 2B and 2C are graphs showing multiple scintillation characteristics per a phenomenon of radiation entrance according to a first embodiment of the present invention. FIGS. 3 and 4 are diagrams showing radiation detectors employing discrimination characteristics as shown in FIGS. 2A, 2B and 2C.

Basically, the radiation detector of the first embodiment includes a scintillator A that scintillates depending on radiation, and a discriminator that discriminates kind of rays in radiation based on scintillation characteristic of the scintillator A. The scintillator A emits a first photo pulse (a first output signal) immediately after radiation occurs, and then emits a plurality of second photo pulses (second output signals) as delayed pulses, after generation of the first photo pulse. Multiple scintillation characteristics, which are varied by energy of radiation, kind of rays in radiation, and energy loss ratio, can be detected by analyzing the second photo pulses in the present invention. The discriminator detects radiation by measuring probability or frequency of occurrence of the first photo pulse and the second photo pulses, considering discrimination of energy of radiation, kinds of rays in radiation, or energy loss ratio.

As an example of the scintillator having a multiple scintillation characteristic, $Gd_2O_2S$ (hereinafter, expressed as GOS), $Y_2O_2S$ (hereinafter expressed as YOS), or the like is selected as a perform. Among them, a perform activated by europium (Eu) or terbium (Tb), such as YOS:Eu, GOS:Eu, YOS:Tb or GOS:Tb has appropriate multiple scintillation characteristics.

Each of FIGS. 2A, 2B or 2C shows the case when YOS:Eu is applied. Waveform 101 shown in an upper stage of each figure means theorical signals which are obtained so that current output free for integration from a photomultiplier tube is converted to voltage pulse by a fast amplifier and is discriminated from noise level by a pulse height analyzer. Waveform shown in a lower stage of each figure is obtained so that the output from the photomultiplier tube is applied to an integrated circuit having a time constant of approximately 50 microseconds.

Specifically, FIG. 2A shows the response when YOS:Eu is disposed on a detecting surface of the photomultiplier tube, and an alpha ray from Am-241 is irradiated. Similarly, FIG. 2B shows the response when a beta ray from Sr-90 is irradiated. In FIG. 2A, many scintillations are delayed from the time of radiation can be seen. Because the pulse height of delayed scintillation pulses tend to decrease gradually, an integrated waveform is accordingly attenuated. As explained above, the integrated circuit has a time constant of approximately 50 microseconds, therefore, the integrated waveform attenuates under a time constant much larger than 50 microseconds.

On the other hand, in the case of irradiation of a beta ray in FIG. 2B, only a single pulse can be observed. FIG. 2C also shows the case of a beta ray as FIG. 2B. As is seen from these figures, the number of delayed scintillation pulses caused by the beta ray are less than those caused by an alpha ray. Note that waveforms caused by a gamma ray are similar to those caused by a beta ray and therefore detailed figures are omitted for clarity and simplicity.

Consequently, the difference of response between the alpha ray and the beta (gamma) ray appears when YOS:Eu, GOS:Eu, YOS:Tb and GOS:Tb are employed. Especially, many delayed scintillation pulses are generated when an alpha ray is irradiated; this means multiple scintillations occurred. Therefore, these typical differences of response waveforms in an alpha ray and a beta ray can be used to discriminate kinds of ray in radiation.

A radiation detector 100 shown in FIG. 3 is constituted so that an alpha ray and a beta ray can be discriminated as shown in FIGS. 2A, 2B and 2C, and the radiation detector 100 is equipped with a function capable of counting the number of multiple scintillations in a predetermined period. In FIG. 3, the radiation detector 100 includes a time width generator 1, as a time gate generator, a counter 2 and a multiple scintillation discriminator 3, as a delayed scintillation counter. The time width generator 1 sets counting periods having a certain time width, with the occurrence of the first photo pulse as a starting point. The counter 2 counts numbers of the second pulses in each time width. The multiple scintillation discriminator 3 changes output signals in accordance with numbers of counted second pulses such that the second pulses meet a predetermined number or not.

Logic signals 101, which indicate entrance of radiation detected by a photo detector A, the photomultiplier tube for example, and is amplified, are input to the time width generator 1. These logic signals 101 are applied to the counter 2 as well as the time width generator 1. The time width generator 1 is triggered by the first single logic signal among the logic signals 101, and generates a pulse signal 102 having a certain time width. The time width generator 1 can neglect entrance of the trigger signals followed by the first logic signal while the pulse signal 102 is output. It can be said that the time width generator 1 acts as a single shot pulse generator free for re-trigger. The pulse signal 102 generated by the time width generator 1 is input to the counter 2, and the counting function of the counter 2 is effective only when the counter 2 accepts the pulse signal 102.

Therefore, the time width generator 1 performs as a gate when the first logic signal is applied, and the following multiple scintillation pulses are counted in the counter 2 in a certain time period. The counter 2 is controlled such that the output pulse from the time width generator 1 functions as a gate signal, and is reset when the time period, as a single gate period, is ended. The counted number by the counter 2 before a reset is output to the multiple scintillation discriminator 3 as a count signal 103.

The multiple scintillation discriminator 3 compares the counted number of the multiple scintillations with a threshold value, and outputs classified binary signals 104. The classified signals 104 indicate whether a radiation includes an alpha ray or a beta (gamma) ray. By considering both the pulse signal 102 from the time width generator 1 and the classified signals 104 from the multiple scintillation discriminator 3, discriminated information of the alpha ray and the beta (gamma) ray can be obtained.

FIG. 4 shows a specific structure of FIG. 3. In FIG. 4, the logic signals 101, which indicate entrance of radiation as FIG. 3, are output from a negative logic input terminal B. A first gate 5 and a single shot 4 in FIG. 4 correspond to the time width generator 1 in FIG. 3, and a function of time width generation free for re-trigger can be realized.

Time width can be set arbitrary by components (not shown) accompanied with the single shot 4. The logic signals (negative logic input signals) 101 are also input to a second gate 6. The negative logic input signals 101 can pass the second gate 6 after the second gate 6 is gated by an output signal from the first single shot 4 and when this output signal is supplied to the second gate 6. The output signal that passed through the second gate 6 is then input to a preset down counter 7.

On the other hand, the single shot 4 is equipped with a first initialize circuit 8 and a second initialize circuit 9. The first initialize circuit 8 generates an initialize signal 102a when it turns on. The second initialize circuit 9 generates an initialize signal 102b immediately after the supply of output signals from the single shot 4 is ended. Either one of the initialize signal 102a or 102b is input to the preset down counter 7 by a third gate 10.

The preset down counter 7 normalizes its output signal to a preset value based on the initialized signal 102a or 102b, and counts down its output signal according to input signals to a clock input (CK) of the preset down counter 7. If the output signal of the preset down counter 7 reaches zero, a negative logic signal "ZERO" is then output. Therefore, a positive logic signal can be obtained when this negative logic signal is supplied to an inverter 11.

If the output signal from the preset down counter 7 does not reach zero within a certain time width generated by the single shot 4, the preset down counter 7 is initialized without outputting "ZERO". Consequently, whole number of rays in radiation can be counted when output pulses from an output terminal Q of the single shot 4 are counted, and the number of alpha rays can be counted when output signals from the inverter 11 are counted.

Therefore, numbers of beta rays or gamma rays can be counted by subtracting numbers of the alpha rays from whole numbers counted.

(Second Embodiment)

A radiation detector 200 of a second embodiment is constituted so that the second pulses generated during the time gate are counted, and the time gate is divided proportionally, and the number of signals in each of the divided time gates is counted. That is, the second embodiment differs from the first embodiment in that the counted result is not classified as binary information but is applied as analog information.

Figure 5:
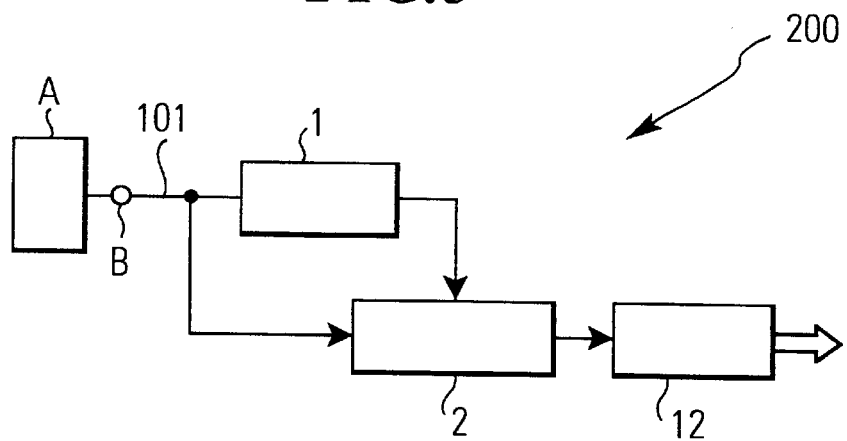
FIG. 5 is a diagram showing a radiation detector according to a second embodiment of the present invention.

FIG. 5 is a diagram showing a radiation detector according to the second embodiment of the present invention. Here, the radiation detector 200 is capable of counting the value of the multiple scintillations in a certain time period, considering discrimination of an alpha ray and a beta ray.

As shown in FIG. 5, the radiation detector 200 includes the time width generator 1 and the counter 2 to which the logic signals 101 are input, similar to the first embodiment. However, the radiation detector 200 is equipped with a multi-channeled multiple scintillation discriminator 12 instead of the multiple scintillation discriminator 3 shown in FIG. 3, which was used to compare the counted number of the multiple scintillations with a threshold value, and to output a classified binary signal.

The multi-channeled multiple scintillation discriminator 12, on the contrary, is used to provide information in order to obtain counted numbers per a phenomenon and a two-dimensional histogram indicating occasion probability of the phenomenon. For example, counted values of the multi-channeled multiple scintillation discriminator 12 are expressed in binary code and the binary code is set as an address signal of a memory. The histogram can be obtained by adding "+1" to the address signal each time a phenomenon occurs.

It is assumed that a time period, frequency, and the like of occurrence of multiple scintillations rely on mass and energy of charged particles. Therefore, if charged particles, accelerated ions and the like having various masses and energies are needed to be detected, together with an alpha ray having a fixed energy, the histogram can be used to discriminate any kinds of particles entering the scintillator.

(Third Embodiment)

A radiation detector 300 of a third embodiment is constituted so that the second pulses can be re-triggered even if any pulse is triggered, and the time width generated by the triggered pulse is measured and compared with a predetermined value, and a discriminated result is changed whether the measured time width exceeds the predetermined value or not.

Figure 6:
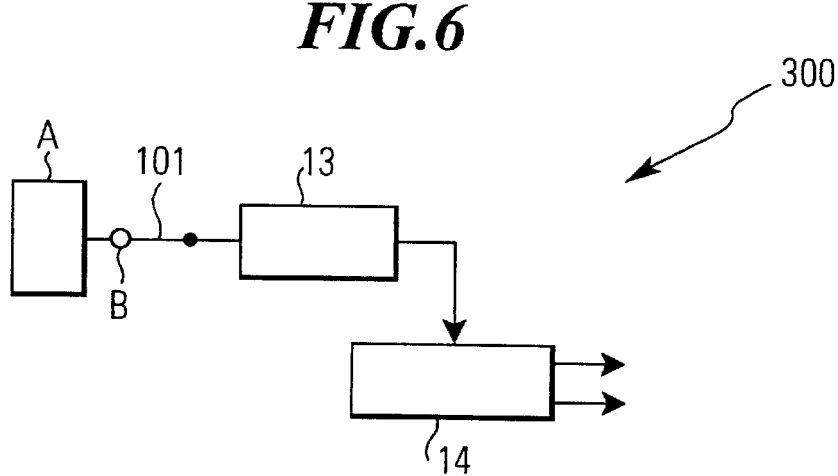
FIG. 6 is a diagram showing a radiation detector according to a third embodiment of the present invention.

FIG. 6 is a diagram showing the radiation detector 300 according to the third embodiment of the present invention. Here, the radiation detector 300 is capable of measuring time width during multiple scintillations, considering discrimination of an alpha ray and a beta ray.

In the third embodiment, a multi-channeled time width generator 13 is disposed and the logic signals 101 indicating entrance of radiation are input to the time width generator 13. The multi-channeled time width generator 13 outputs a pulse signal having a certain time width based on a trigger signal. However, if the next trigger signal is input to the time width generator 13, another pulse signal is then output with the entrance of the trigger signal as a starting point. That is, the multi-channeled time width generator 13 can be a conventional single shot generator having a re-trigger function.

Time width output from the multi-channeled time width generator 13 is previously defined by an average value of the multiple scintillation intervals. As an example, if a time width is set equal to average value of time intervals plus triple of a standard deviation, more than 99% of multiple scintillation pulses can be triggered. Output pulse signals are extended continuously due to multiple scintillations, and finally, the total time width of actual output pulse signal becomes longer than the predetermined time width.

The output from the scintillation time width generator 13 is applied to a pulse width discriminator 14. The pulse width discriminator 14 compares the applied pulse width with a threshold value, and discriminates depending on whether the pulse width exceeds the threshold value or not, and then outputs in binary code. Thereby, counted information discriminated by an alpha ray and a beta (gamma) ray can be obtained.

(Fourth Embodiment)

A radiation detector 400 of a fourth embodiment is constituted so that the second pulses can be re-triggered even if any pulse is triggered, and the time width generated by the triggered pulse is measured, and thereby kind of rays in radiation, energy, energy loss ratio and the like can be discriminated. That is, the fourth embodiment differs from the third embodiment in that the counted result is not classified as binary information but is applied as analog information.

Figure 7:
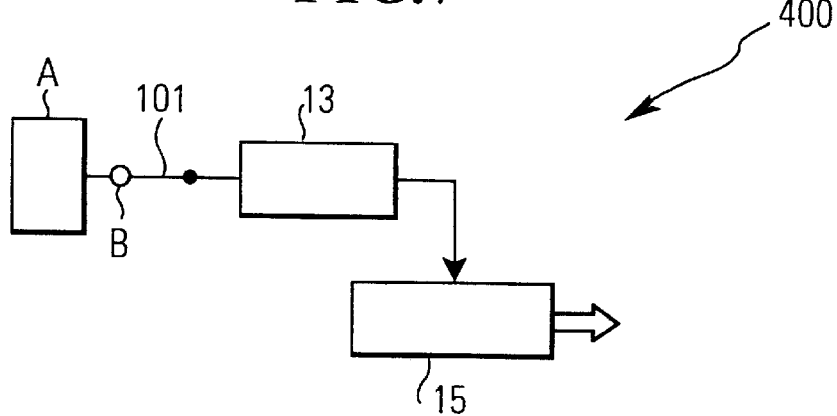
FIG. 7 is a diagram showing a radiation detector according to a fourth embodiment of the present invention.

FIG. 7 is a diagram showing the radiation detector 400 according to the fourth embodiment of the present invention. Here, the radiation detector 400 is capable of measuring time width during multiple scintillations, considering discrimination of an alpha ray and a beta ray.

As shown in FIG. 7, the radiation detector 400 is equipped with a multi-channeled time width generator 15 instead of the time width generator 14 shown in FIG. 6. The multi-channeled time width generator 15 is used to provide information in order to obtain a pulse width per a phenomenon and a two-dimensional histogram indicating occasion probability of the phenomenon.

The method such as used in a time-digital converter and the like can be employed to measure time in the multi-channeled multiple scintillation discriminator 12. That is, counting fast clock pulses having a certain frequency is executed and the obtained count values are converted to binary code. Then, the binary signal is set as an address signal of a memory, and a histogram can be obtained by adding "+1" to the address signal each time a phenomenon occurs.

It is said that a time period, frequency, and the like of occurrence of multiple scintillations rely on mass and energy of charged particles. Therefore, if charged particles, accelerated ions and the like having various masses and energies are needed to be detected, together with an alpha ray having a fixed energy, the histogram can be used to discriminate any kinds of particles entered.

(Fifth Embodiment)

A radiation detector 500 of a fifth embodiment is constituted so that a resistor and a condenser coupled in parallel to each other are charged by a current obtained by photoelectric conversion of the first pulse and the second pulses, and charged/discharged voltage generated on terminals is amplified as an integrated waveform, and a time width is measured when pulse heights of the waveforms exceed a predetermined value, and discrimination result is changed depending on whether an integrated pulse width exceeds a predetermined time width or not.

Figure 8:
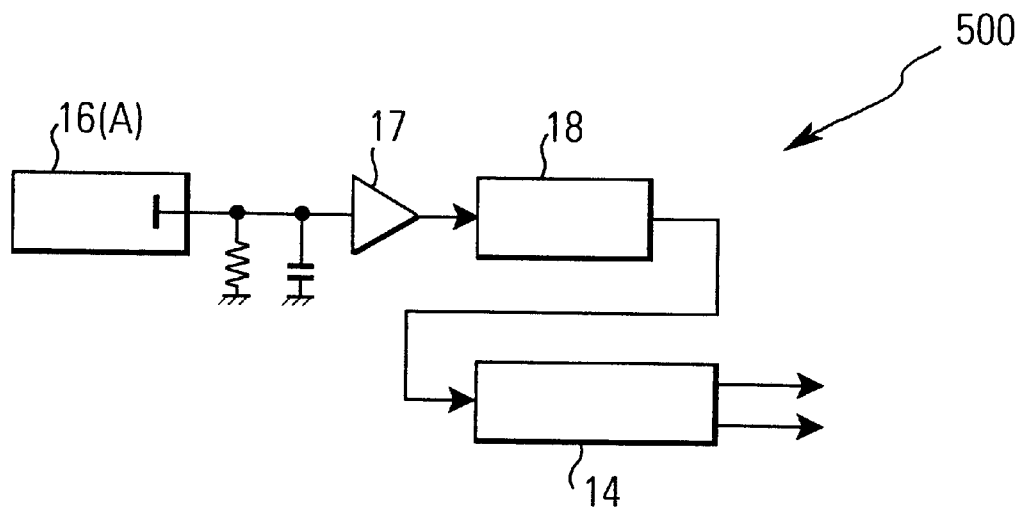
FIG. 8 is a diagram showing a radiation detector according to a fifth embodiment of the present invention.

FIG. 8 is a diagram showing the radiation detector 500 according to the fifth embodiment of the present invention. Here, the radiation detector 500 is capable of measuring time width by using integrated pulse width during multiple scintillations, considering discrimination of an alpha ray and a beta ray.

Output signals from a photomultiplier tube 16 are input to a preamplifier 17 accompanying an integration filter as an output terminal formed by a resistor and a condenser. Output signals from the preamplifier 17 have pulse waveforms whose characteristic is similar to the lower stage of FIG. 2A, 2B or 2C. If multiple scintillations are not detected, the waveform shows exponential form shown in lower stage of FIG. 2B, that is, the waveform attenuates depending on a time constant defined by the resistor and the condenser. If multiple scintillations are detected, the waveform shows integration pulse form shown in lower stage of FIG. 2A, that is, the waveform attenuates depending on a period during multiple scintillations.

These signals having integrated pulse form are input to a voltage comparator 18. If the voltage level exceeds a certain threshold, the comparator 18 outputs signals indicating the voltage level. Therefore, the output pulse signals from the comparator 18 have shorter pulse widths if multiple scintillations do not occur, and the pulse width is extended together with the period of multiple scintillations. This pulse width is applied to the pulse width discriminator 14 and is classified as binary code. Thereby, counted information discriminated by an alpha ray and a beta (Gamma) ray can be obtained, depending on whether the pulse width exceeds the threshold value or not.

(Sixth Embodiment)

A radiation detector 600 of a sixth embodiment is constituted so that a resistor and a condenser coupled in parallel to each other are charged by a current obtained by photoelectric conversion of the first pulse and the second pulses, and charged/discharged voltage generated on terminals is amplified as an integrated waveform, and a time width is measured when pulse heights of the waveforms exceed a predetermined value, and thereby kind of rays in radiation, energy, energy loss ratio and the like can be discriminated by obtained pulse width.

Figure 9:
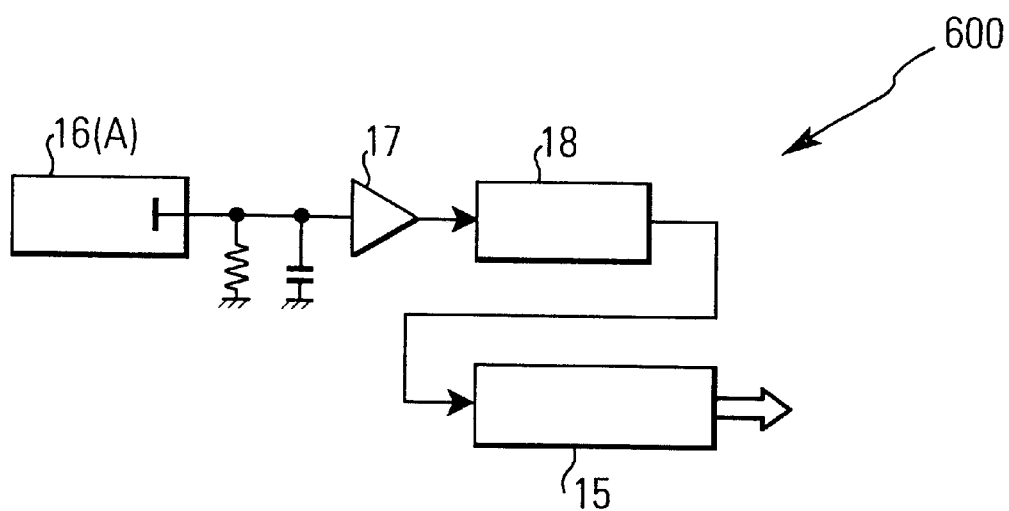
FIG. 9 is a diagram showing a radiation detector according to a sixth embodiment of the present invention.

FIG. 9 is a diagram showing a radiation detector 600 according to the sixth embodiment of the present invention. Here, the radiation detector 600 is capable of measuring time width by using integrated pulse width during multiple scintillations, considering discrimination of an alpha ray and a beta ray.

As shown in FIG. 9, the radiation detector 600 is equipped with the multi-channeled time width generator 15 instead of the multi-channeled time width generator 14 shown in FIG. 8. The multi-channeled time width generator 15 is used to provide information in order to obtain a pulse width per a phenomenon and a two-dimensional histogram indicating occasion probability of the phenomenon. Detailed explanation as to the multi-channeled time width generator 15 is omitted because it has a similar structure as shown in and described above in connection with FIG. 7.

It is said that a time period, frequency, and the like of occurrence of multiple scintillations rely on mass and energy of charged particles. Therefore, if charged particles, accelerated ions and the like having various masses and energies are needed to be detected, together with an alpha ray having a fixed energy, the histogram can be used to discriminate any kinds of particles entered.

(Seventh Embodiment)

A radiation detector 700 of a seventeenth embodiment is constituted so that a discriminator includes a time gate generator and a time interval discriminator. The time gate generator generates a counted number effective period having a certain time width with occurrence of the first photo pulse as a starting point. The time interval discriminator measures time intervals defined by a plurality of the second photo pulses generated in the time gate, and discriminates output signals depending on whether a time interval is measured within a predetermined time interval or not, or whether a mean time interval is shorter the predetermined time interval or not. Thereby, radiation can be discriminated into two patterns.

Figure 10:
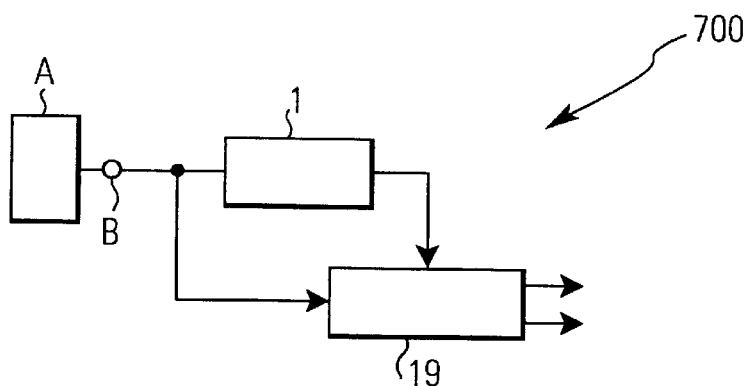
FIG. 10 is a diagram showing a radiation detector according to a seventh embodiment of the present invention.

FIG. 10 is a diagram showing a radiation detector according to the seventh embodiment of the present invention. Here, the radiation detector 700 is capable of detecting occurrence of multiple scintillations by using time interval of pulses, considering discrimination of an alpha ray and a beta ray.

Logic signal indicating entrance of radiation is input to the time width generator 1. This logic signal are applied to a time interval discriminator 19 as well as the time width generator 1. As is explained, the time width generator 1 acts as a single shot pulse generator free for re-trigger. The pulse signal generated by the time width generator 1 is input to the time interval discriminator 19, and the function of measuring time intervals and the function of discrimination of the time width generator 1 are effective when the time width generator 1 accepts the pulse signal.

The time interval discriminator 19 measures time intervals of trigger signals to be input, and discriminates average time intervals to classify by binary code, depending on whether the average time intervals exceed the threshold value or not. If a plurality of pulse signals are not input, and time interval cannot be measured, value of time interval is set to be an infinity. Thereby, counted information discriminated by an alpha ray and a beta (Gamma) ray can be obtained, depending on whether the average time interval exceeds the threshold value or not.

(Eighth Embodiment)

A radiation detector 800 of an eighth embodiment is constituted so that a discriminator includes a time gate generator and a multiple time interval discriminator. The time gate generator generates a counted number effective period having a certain time width with occurrence of the first photo pulse as a starting point. The multiple time interval discriminator measures time intervals defined by a plurality of the second photo pulses during each divided time gate, in which the time gate is proportionally divided, and discriminates output signals depending on transition of the time intervals. Thereby, energy of radiation, kind of rays in radiation, and energy loss ratio and the like can be discriminated. The eighth embodiment provides that the counted result is not classified as binary information but is applied as analog information.

Figure 11:
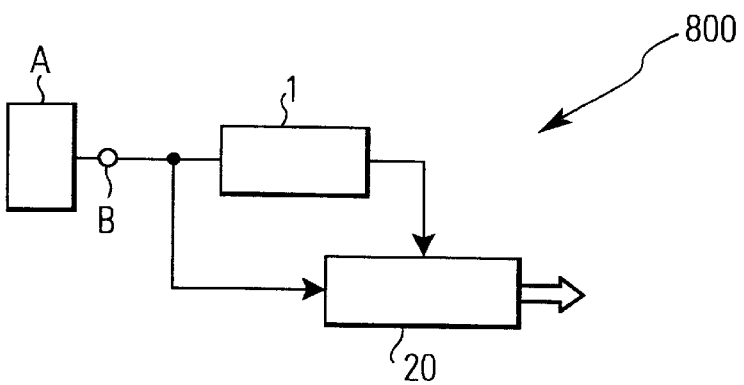
FIG. 11 is a diagram showing a radiation detector according to an eighth embodiment of the present invention.

FIG. 11 is a diagram showing a radiation detector according to the eighth embodiment of the present invention. Here, the radiation detector 800 is capable of detecting occurrence of multiple scintillations by measuring time interval of pulse signals, considering discrimination of an alpha ray and a beta ray.

As shown in FIG. 11, the radiation detector 800 is equipped with a time interval discriminator 20 instead of the time interval discriminator 19 shown in FIG. 10. The time interval discriminator 20 is used to provide information in order to obtain a pulse interval per a phenomenon and a histogram indicating the phenomenon.

It is said that time period, frequency, and the like of occurrence of multiple scintillations rely on mass and energy of a charged particle. Therefore, if charged particles, accelerated ions and the like having various masses and energies are needed to be detected, other than an alpha ray having a fixed energy, the histogram can be used to discriminate any kinds of particles entered.

(Ninth Embodiment)

A radiation detector 900 of a ninth embodiment is constituted so that a discriminator includes a pulse height value comparator that compares emission gains or pulse height values (when converted to electric pulses) of the first photo pulses and the second photo pulses, and discriminates such that there may occurs multiple scintillations when the emission gain or the pulse height value of the second photo pulse is smaller than that of the first photo pulse.

Figure 13:
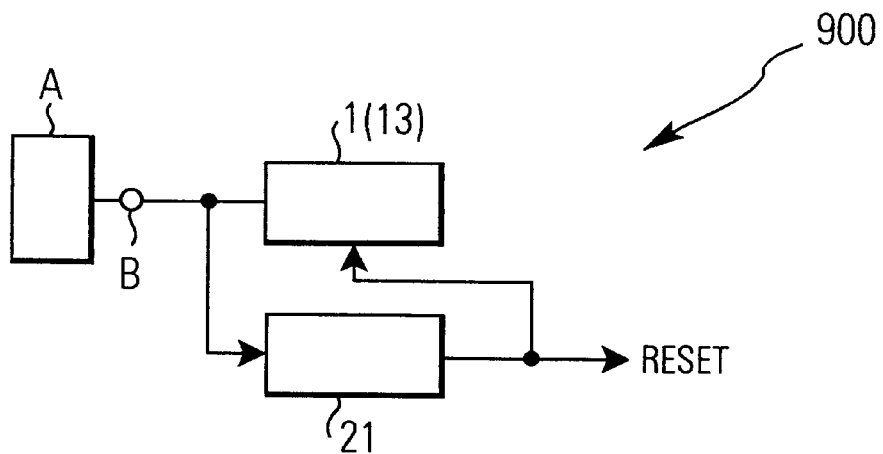
FIG. 13 is a diagram showing a radiation detector according to a ninth embodiment of the present invention.

FIG. 13 is a diagram showing a radiation detector according to the ninth embodiment of the present invention. Here, the radiation detector 900 is capable of detecting multiple scintillations by using information as to pulse height value, considering discrimination of an alpha ray and a beta ray, thereby assuring recognition.

Figure 12:
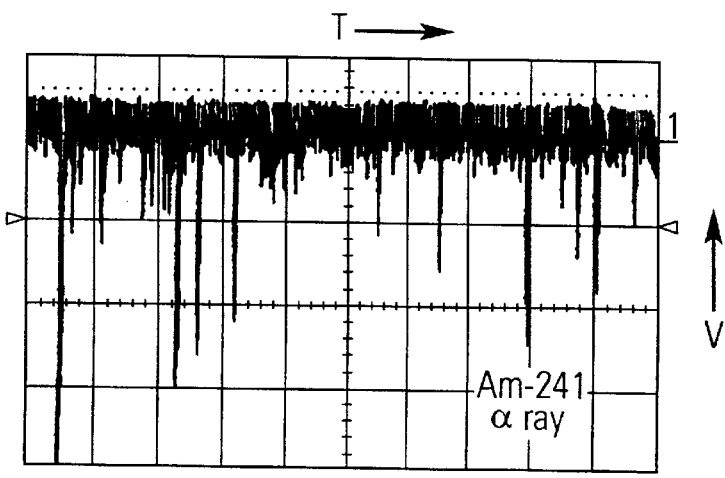
FIG. 12 is a graph showing multiple scintillation characteristics when an alpha ray from Am-241 is irradiated to a YOS:Eu scintillator.

FIG. 12 is a graph showing multiple scintillation characteristics when an alpha ray from Am-241 is irradiated to a YOS:Eu scintillator. That is, this figure shows detected characteristic in the case where an output from a photomultiplier tube is not integrated and is amplified by a fast amplifier.

FIG. 11 also shows condition of occurrence of multiple scintillation with respect to a phenomenon of radiation entrance. It can be understood from FIG. 12 that the pulse height value of the first pulse signal comes to the maximum value among pulse signals. That is, pulse height values of succeeding multiple scintillation pulse signals are apparently less than that of the first pulse signal, although statistical fluctuation exists. By considering this characteristic, a phenomenon of radiation entrance and multiple scintillations can be distinguished certainly.

Logic signal, which indicates a phenomenon of radiation entrance, is input to the time width generator 1 (this can be replaced to the multi-channeled time width generator 13) as well as to a pulse height value comparator 21. This pulse height value comparator 21 stores a pulse height value which is considered to be effective as a trigger signal. When the successive multiple scintillation pulse signals are input, the stored pulse height value is set as a standard level and is compared with the multiple scintillation pulse signals. If the level of multiple scintillation pulse signal is lower than the standard level, the pulse signal is defined as an effective signal and following processes are executed. If the level exceeds the standard level, a reset signal indicating a new phenomenon of radiation entrance is generated and is input to the time width generator 1 (or the multi-channeled time width generator 13) and other devices so that all the signals are reset.

Consequently, discrimination can be executed properly in high probability.

(Tenth Embodiment)

A radiation detector 1000 of a tenth embodiment is constituted so that the first pulses and the second pulses are output as electric pulses, and a resistor and a condenser coupled in parallel to each other are charged by a current thus output, and charged/discharged voltage generated on terminals is amplified as an integrated waveform, and the function of discrimination is effective when the integrated waveform exceeds a certain pulse height value.

Figure 14:
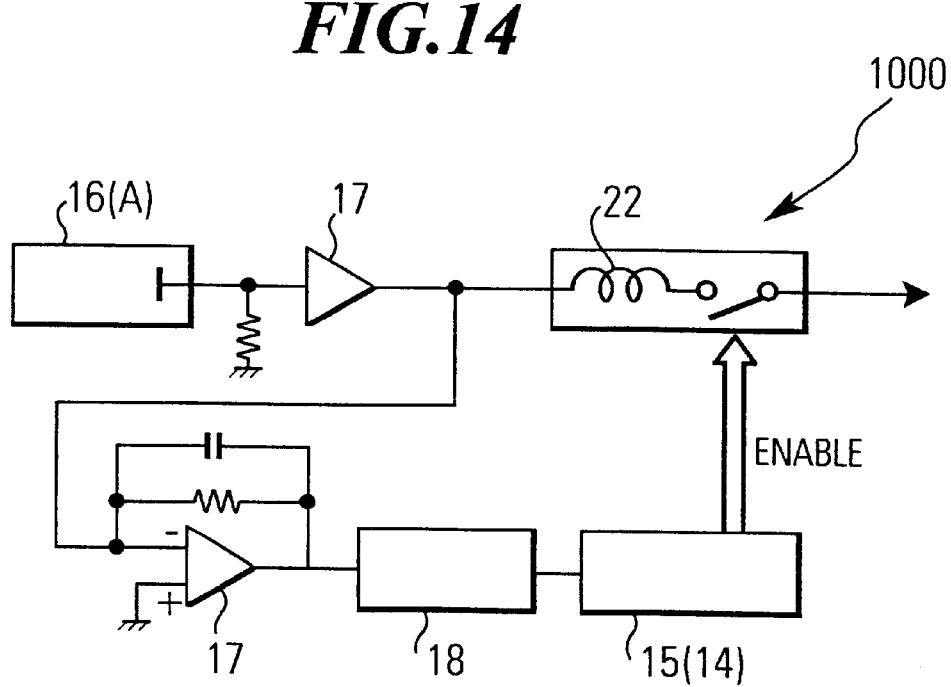
FIG. 14 is a diagram showing a radiation detector according to a tenth embodiment of the present invention.

FIG. 14 is a diagram showing a radiation detector according to the tenth embodiment of the present invention. Here, the radiation detector 1000 is capable of detecting multiple scintillations by using information as to pulse height value of integrated pulses, considering discrimination of an alpha ray and a beta ray, thereby assuring recognition.

In this embodiment, an output signal from the photomultiplier tube 16 is amplified by the fast amplifier 17, without integration, and the output thereof are applied to a switch 22. The output signal from the fast amplifier 17 is applied to an amplifier 17 having integrator, thereby integrated pulse signal is obtained. This integrated pulse signal is input to the voltage comparator 18 and, if this integrated pulse signal exceeds a certain voltage level, an output signal, which closes the switch 22, is output.

The switch 22 includes a delay-action function. The delay time in the switch 22 corresponds to an internal propagation time caused by generating integrated waveforms and comparing voltages.

When an alpha ray and a gamma ray are to be compared, energy of an alpha ray usually has higher energy relative to a gamma ray. Moreover, an alpha ray includes signals having high energy level. Therefore, it is possible to select almost all of the alpha rays by determining if integrated pulse signals have enough pulse height value or not. Thereby, by inputting the determined results to the switch 22, accuracy of discrimination probability by a discriminator connected to the switch 22 can be improved.

(Eleventh Embodiment)

A radiation detector 1100 of an eleventh embodiment is constituted so that the photo pulses generated by multiple scintillations are converted to electric signals and are amplified by maintaining current having response information regarding time.

Figure 15:
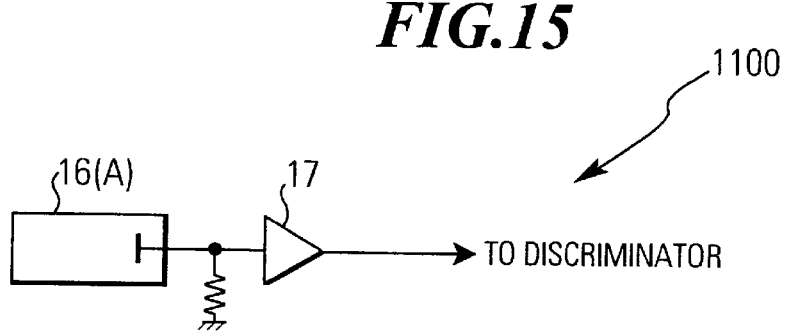
FIG. 15 is a diagram showing a radiation detector according to an eleventh embodiment of the present invention.

FIG. 15 is a diagram showing a radiation detector according to the eleventh embodiment of the present invention. In the radiation detector 1100 shown in FIG. 15, an anode output of the photomultiplier tube 16 is connected to the amplifier 17 such that a resistor is equipped with as a single load. Here, the amplifier 17 has a resistance value is 50 ohm, a gain is approximately two hundred times, and a band width is approximately more than 100 MHz. The output signals from the amplifier 17 are discriminated from noise signals by a pulse height discriminator and a voltage comparator, and the output signals are then converted to logical signals.

These logical signals can be used as the logical signals indicating phenomenon of radiation entrance and as the signals indicating arrival of each pulse generated by multiple scintillations in the present invention. Accordingly, output signals from the amplifier 17 can be input to an arbitrary discriminator in any of above-explained embodiments, and required discriminated result can be obtained.

(Twelfth Embodiment)

A radiation detector 1200 of a twelfth embodiment is constituted so that the photo pulses are output as electric pulses, and a resistor and a condenser coupled in parallel to each other are charged by a current thus output, and charged/discharged voltage generated on terminals is amplified as an integrated waveform, and the voltage is then differentiated.

Figure 16:
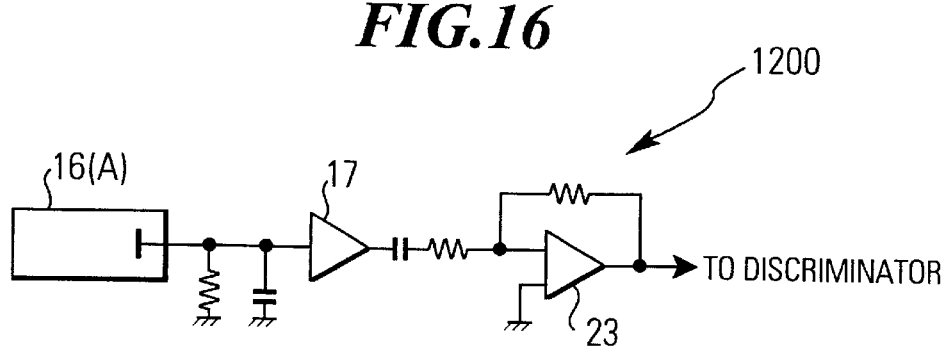
FIG. 16 is a diagram showing a radiation detector according to a twelfth embodiment of the present invention.

FIG. 16 is a diagram showing a radiation detector according to the twelfth embodiment of the present invention. In the radiation detector 1200 shown in FIG. 16, the anode output of the photomultiplier tube 16 is connected to the amplifier 17 such that a condenser and the resistor are equipped with as loads. Because the output of the amplifier 17 is connected to a fast amplifier 23 having a differentiation filter, the fast amplifier 23 can be operated similarly as the amplifier 17 in FIG. 15 functions.

Here, time constants of the integration filter and the differentiation filter can be selected arbitrarily and, therefore, dark current noise signals from the photomultiplier tube 16 and noise signals from the amplifier 17 can be reduced to execute process.

If the output signals from the fast amplifier 23 are discriminated from noise signals by the pulse height discriminator or the voltage comparator, and are then converted to the logical signals, these logical signals can be used as the logical signals indicating phenomenon of radiation entrance and as the signals indicating arrival of each pulse generated by the multiple scintillations in the present invention.

If the integration pulse signals explained in FIG. 14 are employed to this embodiment to avoid miss-discrimination, output signals from both the amplifier 17 and the fast amplifier 23 are used effectively.

(Thirteenth Embodiment)

A radiation detector 1300 of a thirteenth embodiment is constituted so that a correction function is added to the radiation detector 100 of the first embodiment. That is, a dead time compensator compensates the pulse width or the time width used for detecting multiple scintillations and discriminating result, so as to calculate actual counted number rate.

Figure 17:
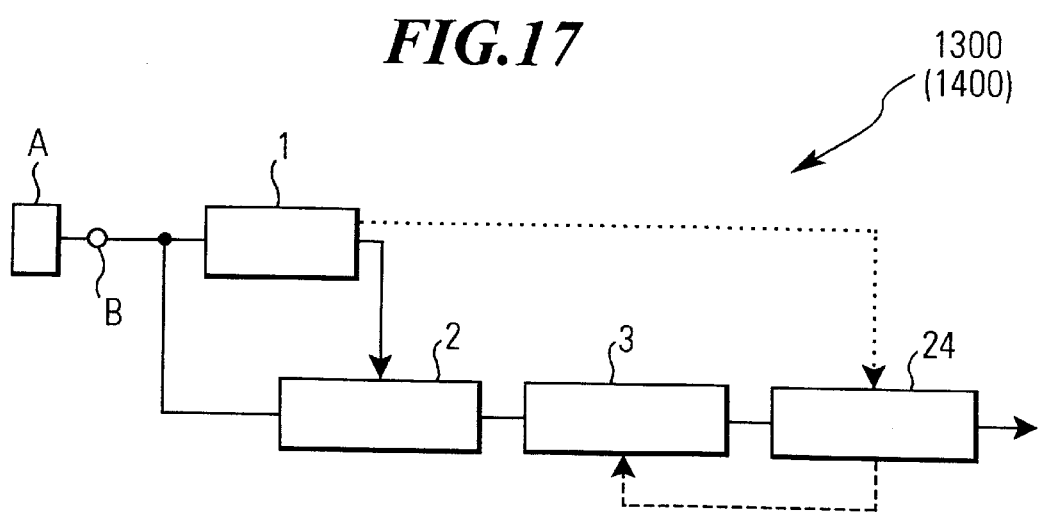
FIG. 17 is a diagram showing a radiation detector according to a thirteenth embodiment and a fourteenth embodiment of the present invention.

FIG. 17 is a diagram showing a radiation detector according to the thirteenth embodiment of the present invention. The radiation detector 1300 can correct miscounts in dead time, and an actual counting rate can be obtained, as well as executing discrimination of radiation.

Output signals from the multiple scintillation discriminator 3 and the time width generator 1 are input to a dead time compensator 24. As shown by dotted line in FIG. 17, output signals from the dead time compensator 24 can be applied to the multiple scintillation discriminator 3. However, this signal flow belongs to the next embodiment and can be omitted in the thirteenth embodiment.

A general dead time compensation in non-paralyzed type is expressed below:

$$R = m(1 - m \cdot \tau) \quad (1)$$

Here, "R" represents an actual counting rate, "m" represents a measured counting rate, and "τ" represents a dead time.

Regarding the dead time compensation of this embodiment, output signals from the time width generator 1 is generated every phenomenon of radiation entrance, and the output signals are discriminated between the alpha rays and the beta (gamma) rays. Therefore, a compensation cannot be executed unless measured counting rates of both rays are employed. Hereinafter, processes in the dead time compensator 24 of this embodiment is explained.

Assume that a measured counting rate of output pulse signals from the time width generator 1 is "G", and a counting rate of output signals which exceed a certain threshold level from the counting number discriminator 3 is "A", that is, a counting rate of the alpha rays.

When the actual counting rate "Ra" is obtained by using measured counting rate "A" of the alpha rays, the following equation is applied:

$$Ra = \{A/G\} \cdot \{G/(1 - G \cdot \tau_1)\} \quad (2)$$
$$= A/(1 - G \cdot \tau_1)$$

Here, $\tau_1$ represents an output pulse width from the time width generator 1.

Other than the alpha rays, the actual counting rate of beta (gamma) rays can be obtained by using the following equation:

$$Rb = (G - A)/(1 - G \cdot \tau) \quad (3)$$

By executing these compensation calculations in real-time or after integrating counted numbers, the actual counting rate of each kind of ray can be obtained.

(Fourteenth Embodiment)

A radiation detector 1400 of a fourteenth embodiment is constituted so that conditions for discriminating multiple scintillations caused by the second photo pulses can be varied depending on the actual counted number rate obtained by the dead time compensator.

FIG. 17 is the diagram showing a radiation detector, and belongs to the fourteenth embodiment as well as the thirteenth embodiment of the present invention. The radiation detector 1400 is capable of correcting double-pulses.

As shown in FIG. 17, the dead time compensator 24 can pass the output signals to the multiple scintillation discriminator 3, and the dotted line is active in this embodiment. In this embodiment, counting rate is increased when multiple scintillations occur and, therefore, actual phenomenon of radiation entrance in a certain time width is hardly recognized as multiple scintillations.

When input counting rate is increased, probability of occurrence of multiple phenomenon of radiation entrance in a gate time width, generated by the time width generator 1, is also increased.

If mean time width, that is, a reciprocal of input counting rate, is longer than the gate time width, probability of occurrence of two phenomena in a gate time width "T" may be important. This probability is calculated by using next equations.

Assume that arrival of radiation depends on Poisson distribution. Then the equation is expressed:

$$P(N) = (r \cdot t)^{(N-1)} \cdot \exp(-r \cdot t)/(N-1)? \quad (4)$$

Here, N=2 is assumed, then the probability is expressed:

$$P(2) = (r \cdot t) \cdot \exp(-r \cdot t) \quad (5)$$

Next, "r" represents an actual counting rate, "t" represents a time width in which the gate time width "T" is proportionally divided into "K" pieces, and "M" represents the number of multiple scintillation pulses in time width "t" following a phenomenon of radiation entrance. The number of pulses "E" per time width "t" probably being generated by new phenomenon of radiation entrance is expressed below:

$$E = M \cdot (r \cdot t) \cdot \exp(-r \cdot t) \quad (6)$$

Therefore, a component "E×K" is included in a gate time width on average. This result is applied to the multiple scintillation discriminator 3, and "E×K" is subtracted from the threshold value of discrimination, and the subtracted value is set as a new threshold value in the present condition. According to this way, accuracy of discrimination probability on counted number in multiple scintillations can be improved.

The dead time compensator 24 explained in the thirteenth embodiment and the fourteenth embodiment can be applied to arbitrary embodiments other than these two embodiments.

(Fifteenth Embodiment)

A radiation detector 1500 of a fifteenth embodiment is constituted so that a scintillator having multiple scintillation characteristics and a detector that detects scintillated light are employed, and multiple scintillations are distinguished so as to discriminate between an alpha ray and a beta ray, an alpha ray and a gamma ray, an alpha ray and a proton ray, as well as distinguishing difference of electric charges or mass numbers between accelerated ion particles.

FIG. 18 is a diagram showing a radiation detector according to the fifteenth embodiment of the present invention. The radiation detector 1500 is equipped with a multiple scintillation layer 26a having multiple scintillation characteristics and is capable of discriminating between an alpha ray and a beta ray.

As examples of a multiple scintillation layer 26a, YOS:Eu, GOS:Eu, YOS:Tb, GOS:Tb and the like can be employed. The photomultiplier tube 16 receives the scintillation light, and sends output signals to the amplifier 17, which has no integrators, by a resistor as a load. Instead of applying the amplifier 17 independently, a circuit shown in FIG. 16 is also applicable.

By employing a single scintillator and a single photomultiplier tube, and by sending output signals thereof to the discriminators shown in FIGS. 3 to 17, it makes possible to discriminate between an alpha ray and a beta ray, an alpha ray and a gamma ray, an alpha ray and a proton ray, as well as distinguishing difference of electric charges or mass numbers between accelerated ion particles.

(Sixteenth Embodiment)

A sixteenth embodiment of the present invention is constituted so that the functions for discriminating between gamma rays and neutrons are added to the fifteenth embodiment. That is, materials that includes more hydrogen than fast neutron for neutron-detecting purpose and generates recoil protons, or materials that includes Li-6 or B-10 having reacting section (n,p) or (n, α) compared to a heat neutron are disposed in entrance surface of radiation next to the scintillator, or are employed as mixture to the powdery scintillator. Thereby, charged particles of an alpha ray and a proton generated by the reaction of (n,p) or (n, α) can be discriminated from background gamma rays existing in neutron field.

FIGS. 19A and 19B are sectional views showing scintillators 26 capable of applying a radiation detector according to the sixteenth embodiment of the present invention. Note that the above-explained materials such as YOS and GOS are powdery. Therefore, the materials can be applied to the scintillator 26 by rolling, sintering, or without modifying.

In this embodiment, the multi-scintillator layer 26a is mixed with a charged particle radiating material 26b to obtain the scintillator 26, as shown in FIG. 19A. The charged particle radiating material 26b includes a material that irradiates alpha rays or protons by reacting with B-10, Li-6 or the like, or includes a material that irradiates recoil protons.

On the other hand, the multi-scintillator layer 26a and the charged particle radiating material 26b are independently fixed together to obtain the scintillator 26, as shown in FIG. 19B. Here, the thickness of the charged particle radiating material 26b can be designed by considering alpha rays and protons to pass through.

The scintillator 26 thus obtained is replaced to the multi-scintillator layer 26a shown in FIG. 18, and the neutrons can be discriminated from the gamma rays.

(Seventeenth Embodiment)

A radiation detector 1700 of a seventeenth embodiment is constituted so that there is a first layer having multiple scintillation characteristics and a second layer having a non-multiple scintillation characteristic disposed between the first layer and a photo detector. The multiple scintillations are distinguished so as to discriminate between an alpha ray and a beta ray, an alpha ray and a gamma ray, an alpha ray and a proton ray, as well as distinguishing difference of electric charges or mass numbers between accelerated ion particles.

FIG. 20 is a diagram showing a radiation detector according to the seventeenth embodiment of the present invention. The radiation detector 1700 is equipped with a multiple scintillation layer 26a having multiple scintillation characteristics and is capable of discriminating between an alpha ray and a beta ray, together with a scintillation layer 28 having non-multiple scintillation characteristic.

From the direction which radiation enters, the multiple scintillation layer 26a, the non-multiple scintillation layer 28 and the photomultiplier tube 16 are arranged. Similarly to the structure shown in FIG. 18, output signals from the photomultiplier tube 16 are applied to the amplifier 17. Because multiple scintillations are caused by the alpha rays, the multiple scintillation layer 26a is disposed to be the first layer of the radiation detector 1600. Instead of applying the amplifier 17 independently, a circuit shown in FIG. 16 is also applicable.

This radiation detector 1600 is constituted so that the first layer 26a is used for detecting the alpha rays, and the second layer 28 is used for detecting the beta rays. The second layer 28 has enough thickness to absorb energy of the alpha rays. As for the second layer 28, a conventional scintillator can be employed. If sensitivity over the gamma rays or the like needs to be decreased, a thin plastic scintillator etc. can be chosen.

By sending output signals of the amplifier 17 to the discriminators shown in FIGS. 3 to 17, it makes possible to discriminate between an alpha ray and a beta ray, an alpha ray and a gamma ray, an alpha ray and a proton ray, as well as distinguishing difference of electric charges or mass numbers between accelerated ion particles.

(Eighteenth Embodiment)

A radiation detector 1800 of an eighteenth embodiment includes the charged particle radiating material 26b in FIG. 20. That is, the multiple scintillation layer 26a in FIG. 20 is replaced with the scintillator 26 having the charged particle radiating material 26b, shown in FIGS. 19A and 19B, to realize discrimination between a neutron and a gamma ray.

Namely, the radiation detector 1800 includes the first scintillator 26 having multiple scintillation characteristics, the photomultiplier tube 16, and the second scintillator 28 having non-multiple scintillation characteristic between the first scintillator 26 and the photomultiplier tube 16. In addition, there is provided with a first discriminator that discriminates multiple scintillations, and a second discriminator that discriminates charged particles of an alpha ray and a proton generated by the reaction of (n,p) or (n, α) from background gamma rays existing in neutron field. Thus, discrimination of neutrons from gamma rays can be realized.

(Nineteenth Embodiment)

A radiation detector 1900 of a nineteenth embodiment is constituted so that there are provided a first scintillation layer having multiple scintillation characteristics and a second scintillation layer having a material that scintillates in different scintillation wavelength band from that of the first layer. A wavelength discriminating filter is equipped with each of the layer to transmit its scintillation wavelength band. Thereby, multiple scintillations are discriminated by inputting signals from the photo detector, which receives scintillated light from the first layer outputs, and kind of rays in radiation are discriminated by considering existence of multiple scintillations of each layer as well as considering thickness, transmission ability and scintillation wavelength thereof. Accordingly, this embodiment provides the function of discriminating wavelengths in addition to the functions explained in the seventeenth embodiment.

Figure 21:
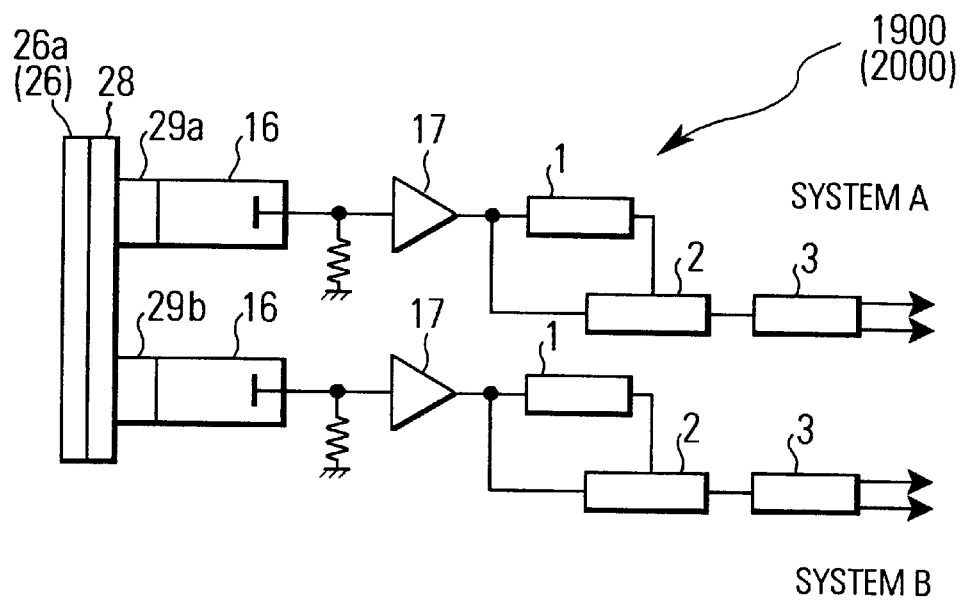
FIG. 21 is a diagram showing a radiation detector according to a nineteenth embodiment and a twentieth embodiment of the present invention.

FIG. 21 is a diagram showing a radiation detector according to the nineteenth embodiment of the present invention. The radiation detector 1900 is equipped with the multiple scintillation layer 26a as the first layer, and the non-multiple scintillation layer as a second layer. Here, it is assumed that discrimination between alpha rays and beta rays is considered. On the opposite surface of the non-multiple scintillation layer 28 where radiation enters, there are provided two photomultiplier tubes 16 having wavelength discrimination filters 29a and 29b. The wavelength discrimination filters 29a and 29b are optically connected to the non-multiple scintillation layers 28 in FIG. 21, however, the wavelength discrimination filters 29a and 29b are not required to be fixed to the non-multiple scintillation layers 28.

In this embodiment, red scintillated light having extremely thin width can be obtained if YOS:Eu or GOS:Eu is employed as the multiple scintillation layer 26a.

Therefore, as the wavelength discrimination filter 29a that detects light from multiple scintillation layer 26a, a scintillator that can transmit only red band is employed. Similarly, as the wavelength discrimination filter 29b that detects light from non-multiple scintillation layer 28, a scintillator that can transmit only blue band is employed. Each anode output signal from the photomultiplier tubes 16 is, for example, input to the amplifier 17 having a resistor as a load. This means that FIG. 20 shows the case when the radiation detector 1900 is connected to the circuit shown in FIG. 3.

In this embodiment, a discrimination regarding wavelength of scintillated light is made at first. By thinning the thickness, sensitivity of the multiple scintillation layer 26a to the beta (gamma) rays can be reduced. Usually, the sensitivity does not take zero. However, disposition of the non-multiple scintillation layer 28 to the detector, as shown in FIG. 21, can reduce the sensitivity further.

In this embodiment, a discrimination circuit for multiple scintillations is also used to process signals from the non-multiple scintillation layer 28. This is to avoid optical leakage from the non-multiple scintillation layer 28. Specifically, all the scintillated pulses generated by the multiple scintillator 26 do not enter the wavelength discrimination filters 29a and 29b, and a part of the pluses may enter the detecting system for the non-multiple scintillation layers 28. The above-explained arrangement of the discrimination circuit can have effects on the case.

According to this embodiment, discrimination of wavelength and discrimination of multiple scintillations are executed. Thereby, the probability of misreading between the alpha rays and the beta (gamma) rays can be reduced.

(Twentieth Embodiment)

A radiation detector 2000 of a twentieth embodiment is constituted to ensure the function in the nineteenth embodiment to the discrimination between neutrons and gamma rays. Namely, there are provided the first scintillation layer having multiple scintillation characteristics and the second scintillation layer having a material that scintillates in different scintillation wavelength band from that of the first layer. A wavelength discriminating filter is equipped with each of the layer to transmit its scintillation wavelength band. Thereby, multiple scintillations are discriminated by inputting signals from the photo detector, which receives scintillated light from the first layer outputs, and charged particles of an alpha ray and a proton generated by the reaction of (n,p) or (n, α) are discriminated from background gamma rays existing in neutron field by considering existence of multiple scintillations of each layer as well as considering thickness, transmission ability and scintillation wavelength thereof.

A radiation detector 2000 of a twentieth embodiment includes the scintillator 26 having the charged particle radiating material 26b in FIG. 21. That is, the multiple scintillation layer 26a in FIG. 21 is replaced with the scintillator 26 having the charged particle radiating material 26b, shown in FIGS. 19A and 19B.

According to this embodiment, discrimination of wavelength and discrimination of multiple scintillations are executed. Thereby, the probability of misreading between the alpha rays or the protons, which are generated when neutrons enter the charged particle radiating material 26b, and the gamma rays can be reduced.

(Twenty-first Embodiment)

Figure 22:
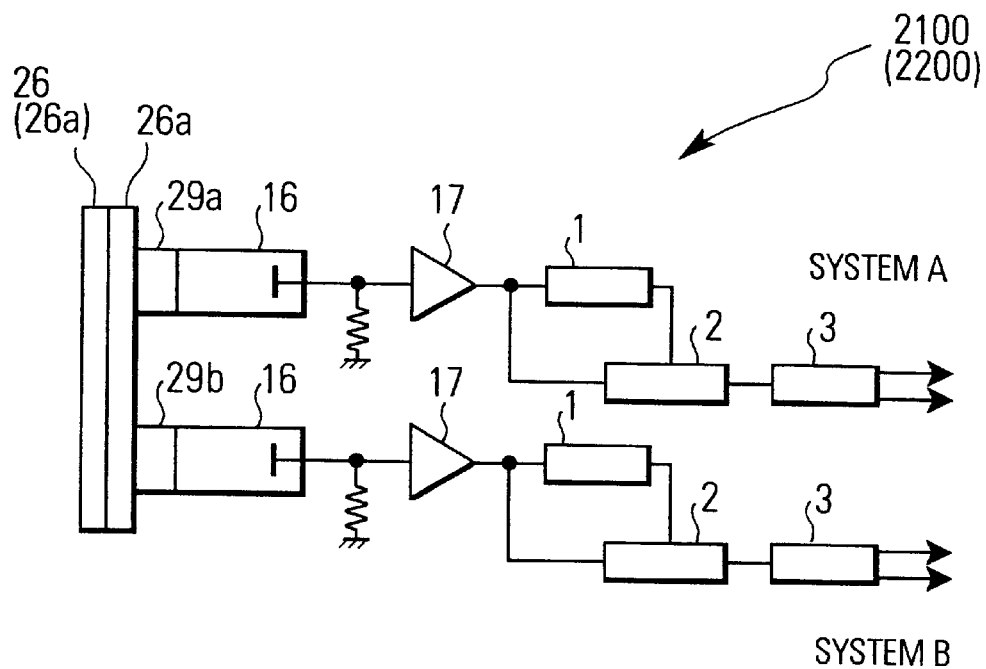
FIG. 22 is a diagram showing a radiation detector according to a twenty-first embodiment and a twenty-second embodiment of the present invention.

FIG. 22 is a diagram showing a radiation detector according to a twenty-first embodiment of the present invention. The radiation detector 2100 of this embodiment includes the multiple scintillation layer 26a instead of the non-multiple scintillation layer 28 shown in FIG. 21.

As shown in FIG. 22, the second multiple scintillation layer 26a is not used only for reducing the leakage of the scintillated light from the first multiple scintillation layer 26a. The second multiple scintillation layer 26a is also used to detect a part of alpha rays that are not collected by the first multiple scintillation layer 26a. According to this embodiment, the second multiple scintillation layer 26a can detect and discriminate a part of alpha rays that are not collected by the first multiple scintillation layer 26a, as well as reducing the leakage of the scintillated light from the first multiple scintillation layer 26a.

(Twenty-second Embodiment)

FIG. 22 is the diagram showing a radiation detector, and belongs to a twenty-second embodiment as well as the twenty-first embodiment of the present invention. In this embodiment, a radiation detector 2200 includes the scintillator 26 having the charged particles generating material 26b shown in FIG. 19, instead of the multiple scintillation layer 26a explained in the twenty-first embodiment.

According to this embodiment, the second multiple scintillation layer 26a can detect and discriminate charged particles part of alpha rays that are not collected by the first multiple scintillation layer 26a, as well as reducing the leakage of the scintillated light of charged particles generated by entrance of neutrons from the first multiple scintillation layer 26a.

According to the present invention, it is provided a radiation detector having a simple and inexpensive structure, and capable of discriminating radiation with high efficiency.

The foregoing discussion discloses and describes merely an exemplary embodiment of the present invention. As will be understood by those skilled in the art, the present invention may be embodied in other specific forms without departing from the spirit or essential characteristics thereof. Accordingly, the disclosure of the present invention is intended to be illustrative, but not limiting, of the scope of the invention, which is set forth in the following claims. Thus, the present invention may be embodied in various ways within the scope of the spirit of the invention. The entire contents of Japanese Patent Application H11-217032, filed Jul. 30, 1999, are incorporated herein by reference.

What is claimed is:

1. A radiation detector, comprising:
   a scintillator that scintillates depending on radiation and generates a first output signal and at least one second output signal after the first output signal, wherein said at least one second output signal varies the signal pattern thereof with a kind of rays in the radiation; and
   a discriminator that discriminates a kind of rays in the radiation based on the first signal and said at least one second signals.

2. The radiation detector according to claim 1, wherein the scintillator has multiple scintillation characteristics.

3. The radiation detector according to claim 2, wherein the scintillator includes $Gd_2O_2S$ (GOS) or $Y_2O_2S$ (YOS).

4. The radiation detector according to claim 3, wherein the scintillator may be activated by europium (Eu) or terbium (Tb).

5. The radiation detector according to claim 2, wherein the number of the second output signals while a beta ray is detected is larger than when an alpha ray is detected.

6. The radiation detector according to claim 1, wherein the discriminator further comprises:
   a time gate generator that generates a time gate having a certain time width as an input of the first signal as a starting point;
   a counter that counts the number of the second signals in the time gate; and
   a multiple scintillation discriminator that compares a counted number in the time gate with a predetermined value thereby outputs a discriminated result.

7. The radiation detector according to claim 1, wherein the discriminator further comprises:
   a time gate generator that generates a time gate having a certain time width as an input of the first signal as a starting point;
   a counter that counts the number of the second signals in the time gate and divides the time gate proportionally in order to count the number of signals in each of the divided time gate; and
   a multiple scintillation discriminator that compares a counted number in the divided time date with a predetermined value thereby outputs a discriminated result.

8. The radiation detector according to claim 1, wherein the discriminator further comprises:
   a multiple time gate generator that generates time gates having a certain time width as an input of the first signal and the second signal as starting points; and
   a gate width discriminator that compares width of the time gates with a predetermined value thereby outputs a discriminated result.

9. The radiation detector according to claim 1, wherein the discriminator further comprises,
   an amplifier that includes a resistor and a condenser coupled in parallel to each other, the amplifier charges a current obtained by photoelectric conversion of the first signal and the second signals to the resistor and the condenser, and amplifies charged/discharged voltage generated on terminals as an integrated waveform; and
   an integrated pulse height value discriminator that compares pulse heights of the waveforms with a predetermined value thereby outputs a discriminated result.

10. The radiation detector according to claim 1, wherein the discriminator further comprises:
    a time gate generator that generates a time gate having a certain time width as an input of the first signal as a starting point; and
    a time interval discriminator that compares a time interval of the second signals generated in the time gate with a predetermined time interval thereby outputs a discriminated result.

11. The radiation detector according to claim 1, wherein the discriminator further comprises:
    a time gate generator that generates a time gate having a certain time width as an input of the first signal as a starting point; and
    a pulse height value discriminator that compares a pulse height value of a pulse signal of the first signal with a pulse height value of a pulse signal of the second signal thereby outputs a discriminated result.

12. The radiation detector according to claim 1, wherein the discriminator further comprises:
    a time gate generator that generates a time gate having a certain time width as an input of the first signal as a starting point;
    a counter that counts the number of the second signals in the time gate;
    a discriminator that compares a counted number in the time gate with a predetermined value thereby outputs a discriminated result; and
    a dead time compensator that compensates the discriminated result by considering a dead time of the counter.

13. The radiation detector according to claim 1, wherein the scintillator includes a first material capable of providing multiple scintillations and a second material capable of radiating a charged particle.

14. The radiation detector according to claim 1, wherein the scintillator includes a first material capable of providing multiple scintillations and a third material capable of providing a non-multiple scintillation.

15. The radiation detector according to claim 1, wherein the scintillator includes a material capable of providing multiple scintillations and a material capable of providing a non-multiple scintillation, and the multiple scintillations and the non-multiple scintillation are individually detected so that the first output signal and the second output signal are respectively generated.

16. A scintillator comprising a material having multiple scintillation characteristics and scintillates depending on radiation and generates a first output signal and at least one second output signal after the first output signal, wherein said at least one second signal varies the signal pattern thereof with a kind of rays in the radiation.

17. A method of discriminating a kind of rays in radiation, comprising:
    providing a scintillator that scintillates depending on radiation and generates a first output signal and at least one second output signal after the first output signal, wherein said at least one second output signal varies the signal pattern thereof with a kind of a ray in the radiation; and
    discriminating a kind of rays in the radiation based on the first signal and said at least one second signal.

* * * * *